United States Patent
Narasimha et al.

(10) Patent No.: US 9,319,914 B2
(45) Date of Patent: Apr. 19, 2016

(54) SIGNAL MEASUREMENT ON COMPONENT CARRIERS IN WIRELESS COMMUNICATION SYSTEMS

(71) Applicant: Google Technology Holdings LLC, Mountain View, CA (US)

(72) Inventors: Murali Narasimha, Lake Zurich, IL (US); Sandeep H. Krishnamurthy, Mountain View, CA (US); Ravi Kuchibhotla, Gurnee, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 147 days.

(21) Appl. No.: 13/875,462

(22) Filed: May 2, 2013

(65) Prior Publication Data
US 2013/0242789 A1    Sep. 19, 2013

Related U.S. Application Data

(63) Continuation of application No. 13/031,397, filed on Feb. 21, 2011, now abandoned.

(51) Int. Cl.
| | |
|---|---|
| H04W 36/00 | (2009.01) |
| H04W 24/10 | (2009.01) |
| H04W 36/30 | (2009.01) |
| H04L 5/00 | (2006.01) |

(52) U.S. Cl.
CPC .............. *H04W 24/10* (2013.01); *H04W 36/30* (2013.01); *H04L 5/0007* (2013.01)

(58) Field of Classification Search
CPC . H04W 36/30; H04W 24/10; H04W 36/0094; H04W 36/08; H04W 36/18; H04W 36/0083
USPC ........................................... 455/438; 370/252
See application file for complete search history.

(56) References Cited

U.S. PATENT DOCUMENTS

| | | |
|---|---|---|
| 7,020,226 B1 | 3/2006 | Kirkland |
| 7,158,503 B1 | 1/2007 | Kalliojarvi et al. |
| 7,167,513 B2 | 1/2007 | Tsui et al. |
| 7,466,768 B2 | 12/2008 | Su et al. |
| 7,599,664 B2 | 10/2009 | Sebire et al. |
| 7,652,976 B2 | 1/2010 | Wen et al. |
| 7,653,164 B2 | 1/2010 | Lin et al. |
| 7,742,539 B2 | 6/2010 | Fonden et al. |

(Continued)

FOREIGN PATENT DOCUMENTS

WO    2010104365 A2    9/2010

OTHER PUBLICATIONS

United States Patent and Trademark Office, Non-Final Office Action for U.S. Appl. No. 13/031,401 dated May 10, 2013, 15 pages.

(Continued)

*Primary Examiner* — Justin Lee
(74) *Attorney, Agent, or Firm* — Faegre Baker Daniels LLP (57) ABSTRACT

A method in a wireless communication device includes performing measurements of a first serving cell on a first carrier frequency at a first rate, determining whether a signal level of a second serving cell on a second carrier frequency exceeds a threshold, and performing measurements of the first serving cell at a second rate if the signal level of the second serving cell is below the threshold, wherein the second rate is higher than the first rate.

9 Claims, 7 Drawing Sheets

(56) References Cited

U.S. PATENT DOCUMENTS

| | | | |
|---|---|---|---|
| 7,822,399 | B2 | 10/2010 | Wallen et al. |
| 7,831,220 | B2 | 11/2010 | Hammerschmidt et al. |
| 7,856,065 | B2 | 12/2010 | Jonsson |
| 8,050,343 | B2 | 11/2011 | Nordstrom et al. |
| 2003/0185286 | A1 | 10/2003 | Yuen |
| 2005/0047536 | A1 | 3/2005 | Wu et al. |
| 2006/0128339 | A1 | 6/2006 | Petrovic |
| 2006/0286997 | A1 | 12/2006 | Seki et al. |
| 2007/0263667 | A1 | 11/2007 | Dubuc et al. |
| 2008/0279221 | A1 | 11/2008 | Wen et al. |
| 2010/0120442 | A1 | 5/2010 | Zhuang et al. |
| 2010/0166049 | A1 | 7/2010 | Ahirwar et al. |
| 2010/0232395 | A1 | 9/2010 | McLeod et al. |
| 2010/0297955 | A1* | 11/2010 | Marinier et al. ............ 455/73 |
| 2011/0021154 | A1 | 1/2011 | Marinier et al. |
| 2011/0026476 | A1 | 2/2011 | Lee et al. |
| 2011/0032908 | A1 | 2/2011 | Lindoff et al. |
| 2011/0081936 | A1 | 4/2011 | Haim et al. |
| 2011/0103333 | A1 | 5/2011 | Berggren et al. |
| 2011/0212693 | A1 | 9/2011 | Sagfors et al. |
| 2011/0255484 | A1 | 10/2011 | Zhang et al. |
| 2011/0267955 | A1 | 11/2011 | Dalsgaard |
| 2011/0310753 | A1 | 12/2011 | Chou et al. |
| 2011/0310830 | A1 | 12/2011 | Wu et al. |
| 2011/0312328 | A1 | 12/2011 | Choi et al. |
| 2012/0008563 | A1 | 1/2012 | Johansson et al. |
| 2012/0057449 | A1 | 3/2012 | Takaoka et al. |
| 2012/0113935 | A1 | 5/2012 | Lindoff et al. |
| 2012/0122472 | A1 | 5/2012 | Krishnamurthy et al. |
| 2012/0213095 | A1 | 8/2012 | Krishnamurthy et al. |
| 2012/0213096 | A1 | 8/2012 | Krishnamurthy et al. |
| 2012/0214540 | A1 | 8/2012 | Narasimha et al. |
| 2012/0214541 | A1 | 8/2012 | Narasimha et al. |
| 2012/0275330 | A1 | 11/2012 | Sipila et al. |
| 2012/0287875 | A1 | 11/2012 | Kim et al. |
| 2012/0295606 | A1* | 11/2012 | Sebire et al. ............ 455/422.1 |
| 2012/0314675 | A1 | 12/2012 | Vujcic |
| 2013/0036147 | A1 | 2/2013 | Yan |
| 2013/0215772 | A1* | 8/2013 | Kaur et al. ............ 370/252 |
| 2013/0315084 | A1 | 11/2013 | Krishnamurthy et al. |
| 2013/0315085 | A1 | 11/2013 | Krishnamurthy et al. |

OTHER PUBLICATIONS

3GPP TSG RAN WG4 #54, R4-103000 Simulations for Measurements of Deactivated Carriers, Huawei, Madrid, Spain, Aug. 23-27, 2010, 18 pages.
3GPP TSG RAN WG4 #44, R4-071338 "Simulation Results on RSRP with Higher Layer Time Domain Filtering" Samsung, Athens, Greece, Aug. 20-24, 2007, 4 pages.
3GPP TSG RAN WG4 #57AH, R4-110330 "Additional RRM Requirements for Carrier Aggregation" Renesas Electronics Europe, Nokia, Austin, USA, Jan. 17-21, 2011, 6 pages.
3GPP TSG RAN WG4 #43, R4-070742 "Considerations on LTE Measurement Bandwidth, Measurement Period and Reporting Period" Motorola, Kobe, Japan, May 7-11, 2007, 4 pages.
3GPP TSG RAN WG4 Meeting 3GPPRAN4 AH#04, R4-103667, "Discussion about LTE-A UE Capability" Mediatek Inc., Xi'an, China, Oct. 11-15, 2010; 3 pages.
3GPP TSG-RAN WG4 AH#4, R4-103776, "Carrier Imbalance and Carrier Activation/Deactivation" Qualcomm Incorporated, Xian, China, Oct. 11-Oct. 15, 2010; 2 pages.
3GPP TSG-RAN WG4 Meeting #57, R4-104310, "Way forward for RF retuning and carrier aggregation image rejection" Nokia, Mediatek, Jacksonville, United States of America, Nov. 15-19, 2010; 7 pages.
3GPP TSG-RAN Working Group 4 (Radio) Meeting #57, R4-104825, "TP for TR 36.808: Channel spacing for intra-band contiguous CA" Nokia Siemens Networks et al., Jacksonville, FL, US, Nov. 15-19, 2010; 4 pages.
Tubbax et al., "Compensation of IQ imbalance in OFDM systems" 2003 IEEE, 5 pages.
Tubbax et al., "Compensation of IQ Imbalance and Phase Noise in OFDM Systems" IEEE Transaction on Wireless Communications, vol. 4, No. 3, May 2005; 6 pages.
Zou et al., "Joint Compensation of IQ Imbalance and Phase Noise in OFDM Systems" Proceedings of the 40th Asilomar Conference on Signals, Systems and Computers, Pacific Grove, CA, Oct. 2006; 5 pages.
3GPP TSG RAN WG2 #73, R2-11xxxx, "Measurement of Deactivated Scells" Motorola Mobility, Taipei, Taiwan, Feb. 21-25, 2011, 3 pages.
3GPP TSG RAN WG2 #71bis, R2-105340 "Discussion on Measurement Requirement on SCC" ZTE, Xi'an, China, Oct. 11-15, 2010, 2 pages.
3GPP TSG RAN WG4 Ad Hoc #4, R4-103553 "Analysis on Carrier Aggregation (CA) Measurements of SCell" ZTE, Xi'an, China, Oct. 11-15, 2010, 2 pages.
3GPP TSG RAN WG2 #69, Tdoc R2-101197 "Measurement Events for Carrier Aggregation" Ericsson, ST-Ericsson, San Francisco, USA, Feb. 22-26, 2010, 8 pages.
3GPP TSG RAN WG4 #55, R4-102041 "Initial Simulations for Mobility in Carrier Aggregation" Nokia, Nokia Siemens Networks, Montreal, Canada, May 10-14, 2010, 10 pages.
3GPP TSG RAN WG2 #69, R2-101146 "Measurement Events Generalization for Carrier Aggregation" Media Tek Inc., San Francisco, USA, Feb. 22-26, 2010, 4 pages.
3GPP TSG RAN WG4 Ad Hoc #10-03, R4-102730 "Baseline Simulations Assumptions for Measurements of Deactivated Carriers" Nokia et al.; Bratislava, Slovakia; Jun. 28-Jul. 2, 2010, 12 pages.
3GPP TSG RAN WG4 #57AH, R4-110331 "Configurability of Measurement Period for Deactivated SCells" Renesas Electronics Europe, Nokia; Austin, United States; Jan. 17-21, 2011, 3 pages.
3GPP TSG RAN WG4 #58, R4-110936 "Additional RRM Requirements for Carrier Aggregation" Renesas Electronics Europe, Nokia; Taipei, Taiwan; Feb. 21-25, 2011, 8 pages.
3GPP TSG RAN WG4 #58, R4-110963 "Simulation Results for Measurements of Deactivated SCells with Configurable Measurement Cycle in CA Scenario 4" Nokian Corporation, Nokia Siemens Networks; Taipei, Taiwan; Feb. 21-25, 2011, 12 pages.
3GPP TSG RAN WG2 #73, Tdoc R2-111090 "Measurement Behavior for SCell" MediaTek; Taipei, Taiwan; Feb. 21-25, 2011, 4 pages.
United States Patent and Trademark Office, "Non-Final Rejection" for U.S. Appl. No. 13/031,401 dated Nov. 22, 2013, 11 pages.
European Patent Office, Office Action for European Patent Application No. 12706155.4 (related to above-captioned patent application), mailed Sep. 18, 2015.
European Patent Office, International Search Report and Written Opinion for PCT Application No. PCT/US2012/024615 (related to above-captioned patent application), mailed Jun. 18, 2012.
European Patent Office, International Search Report and Written Opinion for PCT Application No. PCT/US2012/024612 (related to above-captioned patent application), mailed May 7, 2012.
European Patent Office, International Search Report and Written Opinion for PCT Application No. PCT/US2012/024652 (related to above-captioned patent application), mailed Jun. 26, 2012.
European Patent Office, International Search Report and Written Opinion for PCT Application No. PCT/US2012/024626 (related to above-captioned patent application), mailed May 7, 2012.

* cited by examiner

SIGNAL MEASUREMENT ON COMPONENT CARRIERS IN WIRELESS COMMUNICATION SYSTEMS

FIELD OF THE DISCLOSURE

The present disclosure relates generally to wireless communications and, more particularly, to measurement of component carriers in wireless communication systems.

BACKGROUND

Carrier aggregation (CA) will be used in future 3GPP LTE wireless communication networks to provide improved data rates to users. Carrier aggregation includes transmitting data to or receiving data from user equipment (UE) on multiple carrier frequencies (component carriers). The wider bandwidth enables higher data rates.

A UE can generally be configured with a set of component carriers (CCs). Specifically, the UE is configured with a cell on each component carrier. Some of these cells may be activated. The activated cells can be used to send and receive data (i.e., the activated cells can be used for scheduling). The UE has up-to-date system information for all configured cells. Therefore, after a cell has been configured, it can be quickly activated. Thus, when there is a need for aggregating multiple CCs (e.g., upon the occurrence of a large burst of data), the network can activate configured cells on one or more of the CCs. Generally, there is a designated primary cell (Pcell) on a CC that is referred to as the primary CC, which is always activated. The other configured cells are referred to as Scells (and the corresponding CCs are referred to as secondary CCs).

The maintenance of a configured CC set in addition to an activated CC set enables battery conservation in the UE while providing CCs that can be activated when necessary, for example, when there is a substantial amount of data to be transmitted.

It is expected that multiple carriers will be activated only when there is a substantial amount of data to be transmitted. This implies that CCs will remain in the configured but deactivated state for extended time periods. It is essential to perform RRM measurements of cells on the deactivated CCs so that the appropriate CCs (and cells) can be activated. Performing measurements of multiple CCs requires the UE to operate its RF frontend at a higher bandwidth (in the case of intra-band aggregation), or to use an alternate transceiver for measurements. Both of these options cause significant power consumption in the UE. Performing frequent measurements of CCs with activated cells does not result in substantial additional power consumption since the UE is required to be able to receive control channels and data channels from the activated cells anyway (and therefore the RF front end needs to be able to receive the activated CCs). A UE is generally not expected to receive control and data channels on deactivated secondary cells. UEs are configured with secondary cells in the deactivated state for extended time periods. Cumulatively, measurements of cells on secondary CCs can consume large amounts of power. Thus it is generally considered beneficial to control the rate at which measurements of cells on secondary CCs are performed to minimize power consumption. That is, it is beneficial to perform measurements of cells on deactivated secondary CCs less frequently than measurements of cells on the primary CC and cells on activated secondary CCs.

The various aspects, features and advantages of the invention will become more fully apparent to those having ordinary skill in the art upon careful consideration of the following Detailed Description thereof with the accompanying drawings described below. The drawings may have been simplified for clarity and are not necessarily drawn to scale.

DETAILED DESCRIPTION

Figure 1:
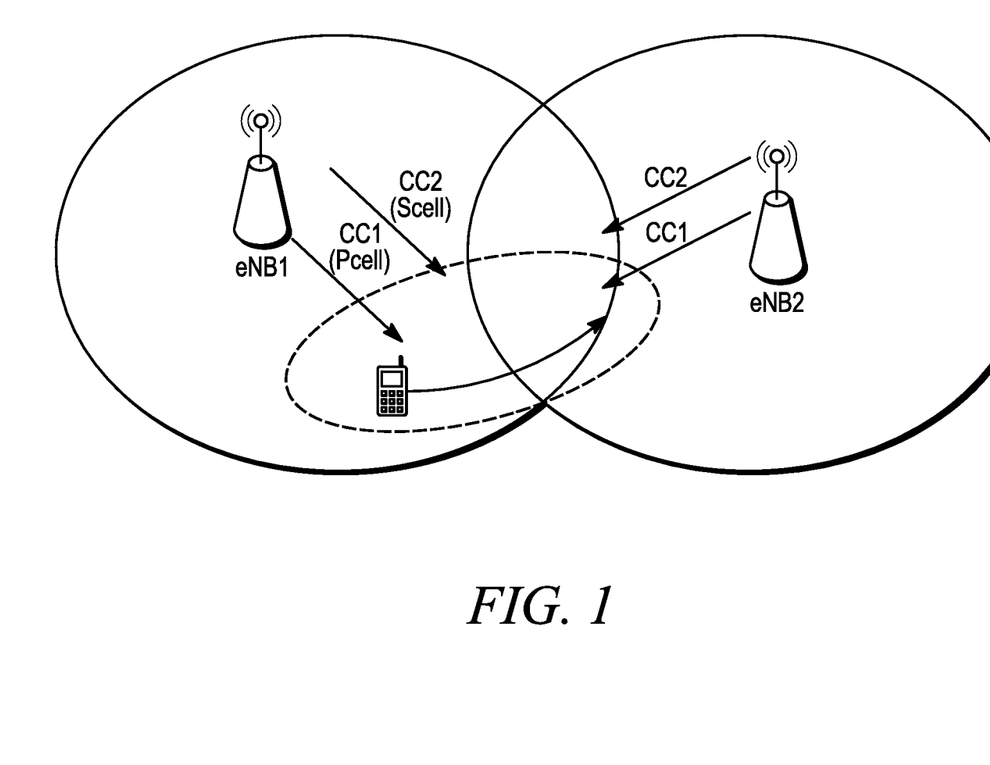
FIG. 1 illustrates an exemplary wireless communication system employing carrier aggregation.

In FIG. 1, a wireless communication system 100 comprises one or more fixed base infrastructure units 101, 102 forming a network distributed over a geographical region for serving remote units in the time and/or frequency and/or spatial domain. A base unit may also be referred to as an access point, access terminal, base, base station, NodeB, enhanced NodeB (eNodeB), Home NodeB (HNB), Home eNodeB (HeNB), Macro eNodeB (MeNB), Donor eNodeB (DeNB), relay node (RN), femtocell, femto-node, network node or by other terminology used in the art. The one or more base units each comprise one or more transmitters for downlink transmissions and one or more receivers for uplink transmissions. The base units are generally part of a radio access network that includes one or more controllers communicably coupled to one or more corresponding base units. The access network is generally communicably coupled to one or more core networks, which may be coupled to other networks like the Internet and public switched telephone networks among others. These and other elements of access and core networks are not illustrated but are known generally by those having ordinary skill in the art.

In FIG. 1, the one or more base units serve a number of remote units, for example, remote unit 103, within a corresponding serving area, for example, a cell or a cell sector, via a wireless communication link. The remote units may be fixed or mobile. The remote units may also be referred to as subscriber units, mobiles, mobile stations, mobile units, users, terminals, subscriber stations, user equipment (UE), user terminals, wireless communication devices, relay node, or by other terminology used in the art. The remote units also comprise one or more transmitters and one or more receivers. In FIG. 1, the base units and remote unit communicates in the time and/or frequency and/or spatial domain. Sometimes the base unit is referred to as a serving or connected or anchor cell for the remote unit. The remote units may also communicate with the base unit via a relay node.

In one implementation, the wireless communication system is compliant with the 3GPP Universal Mobile Telecommunications System (UMTS) LTE protocol, also referred to as EUTRA or 3GPP LTE or some later generation thereof, wherein the base unit transmits using an orthogonal frequency division multiplexing (OFDM) modulation scheme on the downlink and the user terminals transmit on the uplink using a single carrier frequency division multiple access (SC-FDMA) scheme. The instant disclosure is particularly relevant to 3GPP LTE Release 8 (Rel-8), 3GPP LTE Release 9 (Rel-9) and LTE Release 10 (Rel-10) and possibly later evolutions, but may also be applicable to other wireless communication systems. More generally the wireless communication system may implement some other open or proprietary communication protocol, for example, IEEE 802.16(d) (WiMAX), IEEE 802.16(e) (mobile WiMAX), among other existing and future protocols. The disclosure is not intended to be implemented in any particular wireless communication system architecture or protocol. The architecture may also include the use of spreading techniques such as multi-carrier CDMA (MC-CDMA), multi-carrier direct sequence CDMA (MC-DS-CDMA), Orthogonal Frequency and Code Division Multiplexing (OFCDM) with one or two dimensional spreading. The architecture in which the features of the instant disclosure are implemented may also be based on simpler time and/or frequency division multiplexing/multiple access techniques, or a combination of these various techniques. In alternate embodiments, the wireless communication system may utilize other communication system protocols including, but not limited to, TDMA or direct sequence CDMA. The communication system may be a Time Division Duplex (TDD) or Frequency Division Duplex (FDD) system.

In aggregated carrier (AC) systems, a User Equipment (UE) can receive and transmit control and data signaling on multiple component carriers (CCs). In FIG. 1, for example, the UE 103 is configured for carrier aggregation and receives from base station 101 a first component carrier (CC1) and a second component carrier (CC2) wherein CC1 is a primary cell (Pcell) and CC2 is a secondary cell (Scell). Initially, the UE may communicate with the network by receiving only a single CC (Primary or Anchor CC). In some implementations, the network sends a configuration message (SI configuration message) to the UE on the primary CC with system information (SI) corresponding to other CCs on which the network may schedule the UE. The SI typically includes CC specific information that the UE is required to store in order to communicate with the network on other CCs. The SI can include CC specific information such as CC carrier frequency, downlink (DL) bandwidth, number of antennas, downlink reference signal power, uplink (UL) power control parameters and other information that does not change frequently. In some aggregated carrier systems, base station sends the SI configuration message to the UE using Radio Resource Configuration (RRC) signaling, since the SI does not change frequently and the payload associated with the SI configuration is relatively large. Upon receipt of the SI configuration, the UE stores the SI for other CCs but continues to communicate with the network by only receiving the primary CC. The other CCs for which the UE has received SI and the primary CC constitute the UE's "configured CC set".

Figure 2:
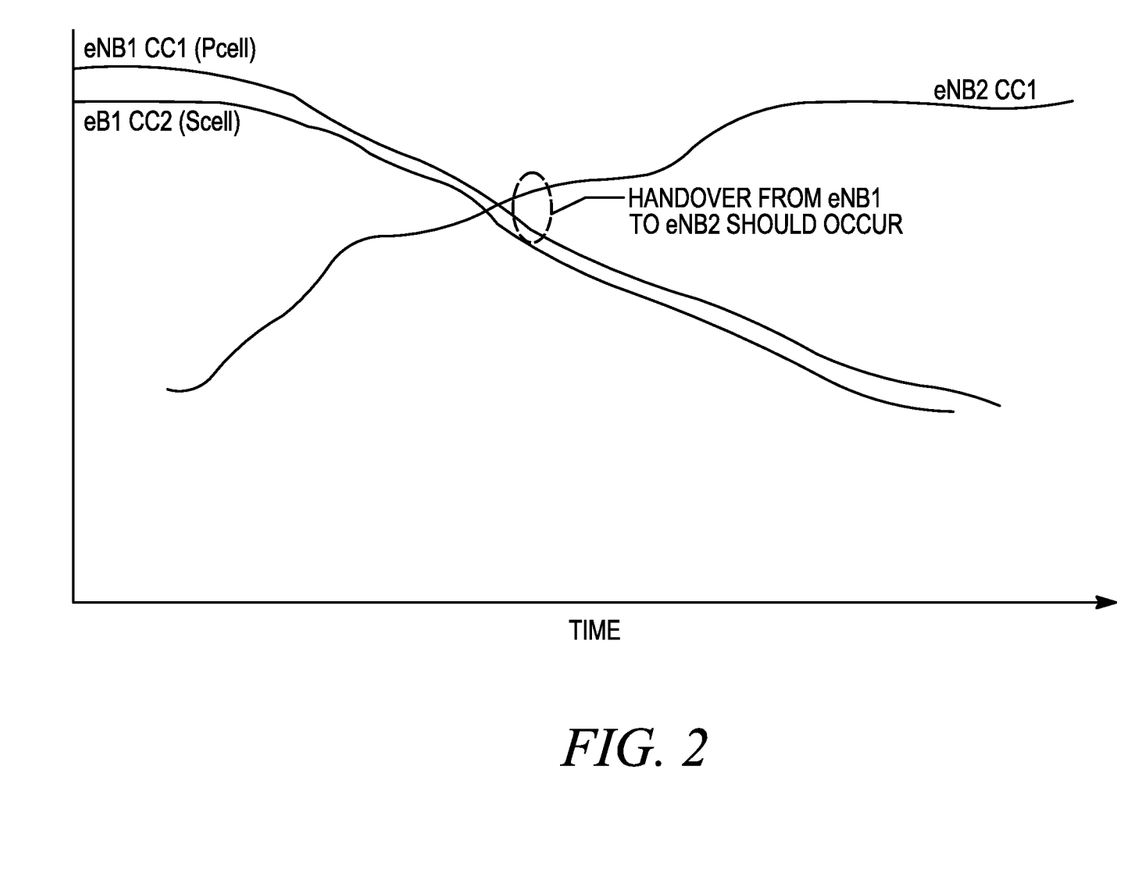
FIG. 2 illustrates the actual conditions experienced by the UE in FIG. 1.
Figure 3:
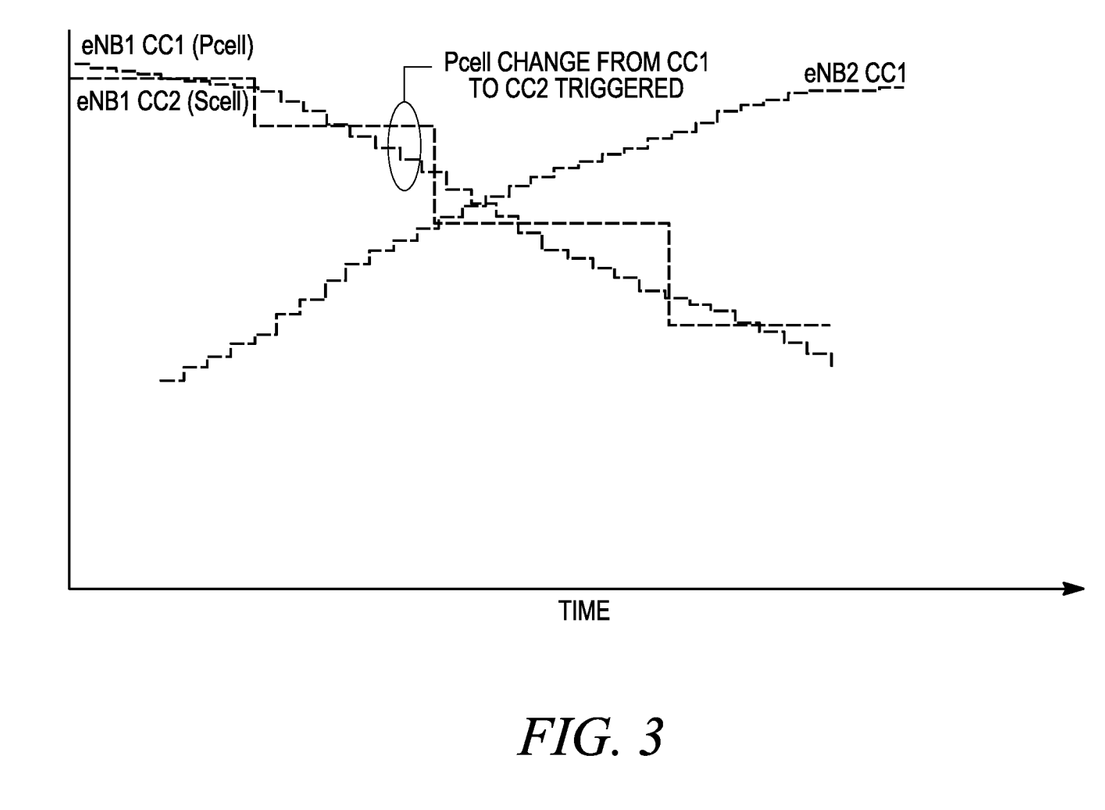
FIG. 3 illustrates apparent radio conditions experienced by a UE in FIG. 1 making measurements on CC2 at a lower measurement rate than the primary cell CC1.

Performing measurements of cells on deactivated secondary CCs less frequently than measurements of cells on primary CC can reduce power consumption. However, having different measurement periods can lead to incorrect mobility decisions at the network. In FIG. 1 for example, the UE 103 is connected to eNB1 and is configured with CC1 as a primary cell (PCell) and CC2 as a secondary cell (Scell). The UE is moving towards eNB2. If the Scell is deactivated (CC2 deactivated), the measurement rate on CC2 is less than the rate on CC1. For example, the measurement period for the primary cell may be 200 ms and the measurement period for the secondary cell may be 1600 ms. In FIG. 1, an inter-eNB handover should be triggered when CC1 from eNB2 102 is better than the primary cell on eNB1 101 (based on an A3 event measurement report). FIG. 2 illustrates the actual radio conditions experienced by the UE in FIG. 1. However, the different measurement periods for the primary cell and secondary cell on eNB 101 lead to a different view of the radio conditions at the UE as illustrated in FIG. 2. FIG. 3 illustrates Layer 3 (L3) filtered measurements at the UE. Since the measurements of the secondary cell are occurring less frequently, the secondary cell measurements as observed by the UE lag the actual radio conditions experienced by the UE. Since the UE includes in measurement reports to the base station L3 filtered measurements of the secondary cell, the UE will report that the secondary cell is better than the primary cell as shown in FIG. 3. This result may cause the eNB1 101 to attempt a primary cell change instead of an inter-eNB handover. An Inter-eNB handover is more appropriate since signal levels of CC1 and CC2 on eNB1 are actually less than CC1 on eNB2. Furthermore, a primary cell change on eNB1 could fail since the CC2 signal is lower than the reported measurement and another handover or primary cell change would be required. Similarly, the different measurement periods can also cause unnecessary inter-eNB handovers when a primary cell change is needed. In the carrier aggregation context, the problem occurs only with deactivated secondary cells. If the secondary cell is activated, the measurements occur at the same rate as the primary cell. However, since the eNB does not know exactly when a handover will be required, it is not practical to pre-activate the secondary cell. Besides, such an approach would defeat the purpose of activation and deactivation.

Although the problem is described above in the context of carrier aggregation, similar or related issues can occur in other scenarios. For example, coexistence of multiple radios in the UE (in-device coexistence) can in some cases lead to similar measurement related problems. Consider the case where the UE has an LTE transceiver and a WiFi transceiver wherein WiFi transmissions by the UE can impact the LTE reception at the UE and LTE transmission by the UE can impact the WiFi reception at the UE. Specifically, when WiFi transmission activity is started, the measurements on the LTE side see a sudden and significant impact.

Figure 4:
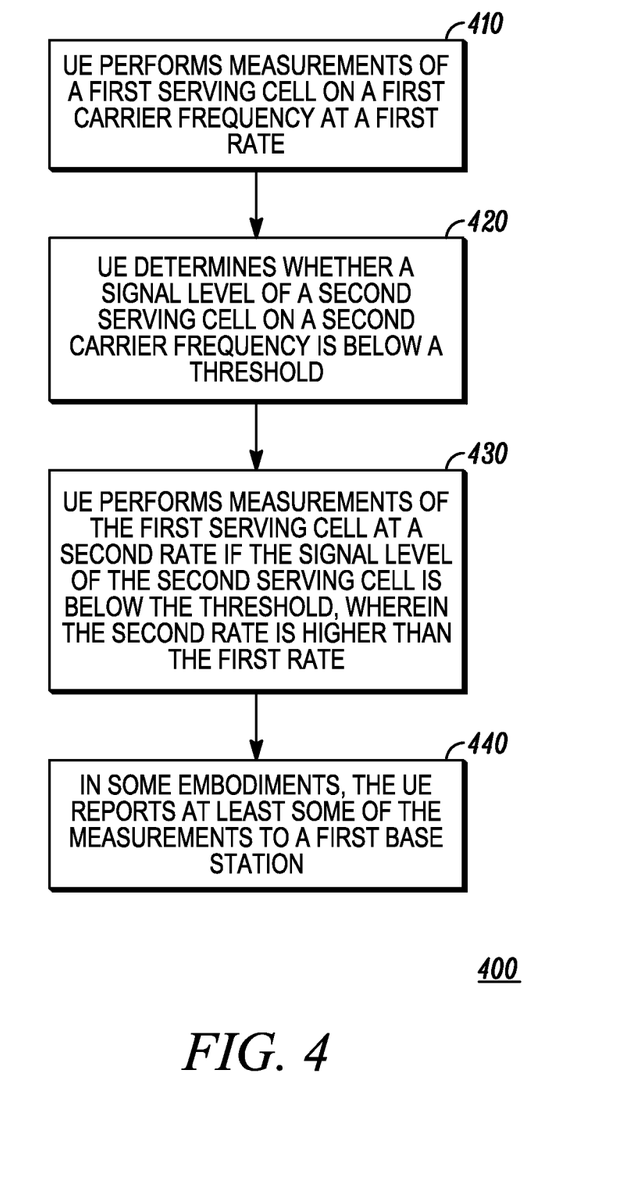
FIG. 4 illustrates a process flow diagram.

According to a first aspect of the disclosure illustrated in the process flow diagram 400 of FIG. 4, a wireless communication device performs measurements of a first serving cell on a first carrier frequency at a first rate at 410. At 420, the UE determines whether a signal level of a second serving cell on a second carrier frequency is below a threshold. In one embodiment, the threshold is a secondary serving cell measurement threshold signaled to the UE by the base station. In other embodiments, the threshold is stored locally or is obtained from some other source. At 430, the UE performs measurements of the first serving cell at a second rate if the signal level of the second serving cell is below the threshold. In one instantiation, the rate of measurements of the secondary serving cell on the second carrier frequency (and, if necessary, other cells on the second carrier frequency) increase when the signal measured on the primary serving cell is below the threshold. In some embodiments, the measurements performed on the carrier frequencies are filtered, for example, by a layer 3 (L3) filtering process implemented using an infinite impulse response filter or other suitable filter.

The UE generally comprises a controller coupled to a wireless transceiver wherein the controller is configured to perform measurements on the carrier frequencies as described above. The measurement functionality performed by the controller may be implemented by a digital processor that executes software or firmware stored on a memory device.

Similarly, the controller may perform the filtering functionality and other functions described herein by executing software or firmware. Alternatively the functionality of the UE may be performed by equivalent hardware or by a combination of hardware and software.

In one implementation, the UE is configured for carrier aggregation and the first carrier frequency is a deactivated carrier and the second carrier frequency is a primary carrier frequency. According to this implementation, the UE increases the rate at which measurements are made on the deactivated carrier when the signal on the primary carrier falls below the threshold to more accurately assess radio conditions to which the UE is subject. In some implementations, the eNB configures the UE for carrier aggregation on a primary serving cell on a first carrier frequency and on a secondary serving cell on a second carrier frequency. As suggested above, the eNB may also determine a secondary serving cell measurement threshold to the wireless communication terminal. The eNB may signal the secondary serving cell measurement threshold to the wireless communication terminal. Thus the UE is provided a primary cell signal threshold below which measurements of cells on deactivated secondary CCs is performed more frequently. For example, referring to the above scenario, if the UE observes that the primary cell signal is above the threshold, the UE performs measurements of deactivated secondary cell with a relatively long measurement period of 1600 ms to reduce power consumption. When the UE observes that the primary cell signal drops below the threshold, the UE performs measurements of the deactivated secondary cell with a measurement period of 480 ms. Alternatively, other measurement periods may also be used.

In another implementation, the UE increases the rate at which measurements are made on the deactivated carrier when the difference between the signal on the primary carrier and a signal on another carrier rises above a threshold. In some implementations, the eNB configures the UE for carrier aggregation on a primary serving cell on a first carrier frequency and on a secondary serving cell on a second carrier frequency. The eNB may also configure a measurement reporting offset, so that the wireless communication terminal reports measurements if the difference between the signal level of a cell other than the primary serving cell and the signal level of the primary cell is higher than the measurement reporting offset. For example, the UE is configured with an A3 measurement event, the event set to trigger when a neighbor cell signal is higher than the primary serving cell signal by more than the measurement reporting offset. The UE reports measurements when the A3 measurement event is triggered. In addition to reporting measurements, the UE performs measurements of cells on deactivated secondary CCs more frequently. For example, referring to the above scenario, if the UE observes that the neighbor cell signal is not higher than the signal of the primary cell by the measurement reporting offset, the UE performs measurements of deactivated secondary cell with a relatively long measurement period, for example, 1600 ms, to reduce power consumption. When the UE observes that the neighbor cell signal is higher than the signal of the primary cell by at least the measurement reporting offset, the UE performs measurements of the deactivated secondary cell with a measurement period, for example 480 ms. Alternatively, other measurement periods may also be used.

Figure 5:
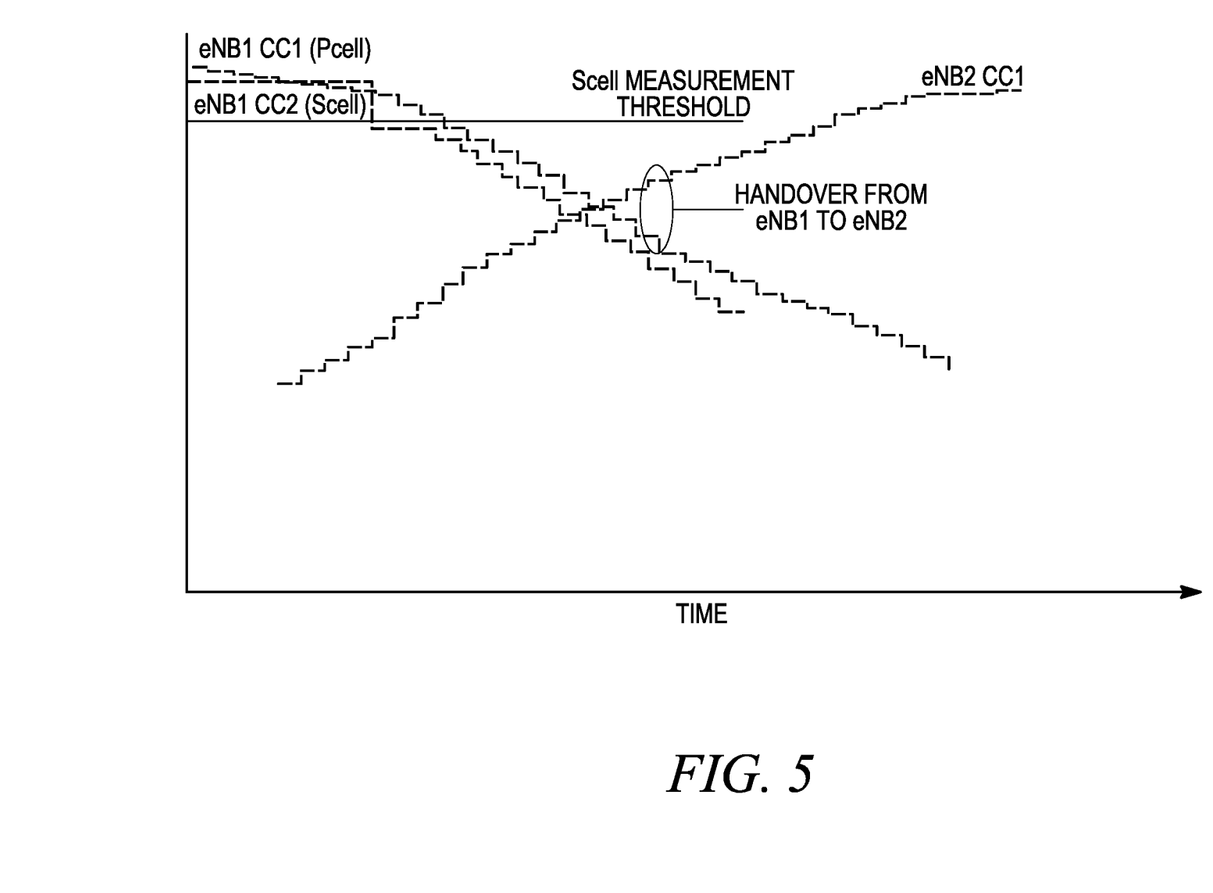
FIG. 5 illustrates more accurate radio conditions experienced by the UE in FIG. 1 making measurements on CC2 at a measurement rate higher than the lower measurement rate of FIG. 3.

FIG. 5 illustrates the effect of applying the second measurement rate to the first serving cell, which corresponds to the deactivated carrier in the aggregated carrier implementation. The more accurate radio conditions (illustrated in FIG. 5) produced using the second measurement rate indicate that the UE should perform an inter-base station handover from eNB1 to eNB2, rather than an intra-base station handover suggested by the radio conditions measured at the lower rate (as illustrated in FIG. 3). In some implementations, the eNB commands the UE to perform the handover as described further below, but more generally the handover decision may be made autonomously by the UE.

In other implementations, the UE could be a multimode device, for example, a WiFi enabled LTE device. In this implementation, the UE can perform measurements of one or more of the serving cells more frequently based on WiFi activity being initiated or based on some other criteria.

The base station also comprises a controller coupled to a wireless transceiver wherein the controller is configured to perform the various functions described herein including configuring the UE for aggregated carrier operation and transmission of the threshold to the UE in embodiments for implementations that require it, receipt and processing of measurement reports from the UE, handover analyses and command transmission, among other functions performed by the base station. Alternatively the functionality of the eNB may be performed by equivalent hardware or by a combination of hardware and software.

In FIG. 4, at 440, in some embodiments the UE reports information based on at least some of the measurements to a first base station. In the aggregated carrier implementation above, for example, the information is based on at least the measurements performed on the first serving cell at the second rate, since these measurements more accurately depict the radio conditions experienced by the UE. In some embodiments, the measurements performed on the first serving cell are filtered as described above and the UE reports the filtered measurements to the eNB or base station. In other implementations however, the UE may choose to selectively not report some measurements, filtered or otherwise, a base station. Such embodiments include those where the UE makes handover decisions autonomously or where the UE provides handover assistance information to the base station based on the measurements.

In response to sending a measurement report to the eNB, the UE may receive a handover command from eNB. Generally, the handover command may be for an intra-base-station handover or for an inter-base-station handover. An inter-base-station handover is a handover from a first base station to a second base station serving a different coverage area than that of the first base station, for example, from eNB1 to eNB2 in FIG. 1. In one embodiment, an intra-base-station handover is a change in primary serving cell. In FIG. 1, for example, the deactivated secondary cell CC2 could be made the primary serving cell in an intra-base-station handover in response to receiving the handover command. Further, an intra-base-station handover can include a change of primary cell from a first cell of the base station on a first frequency to a second cell of the same base station on a second frequency, wherein the second cell is served by a remote antenna or a remote radio head that is communicably coupled to the base station. Remote antennas and remote radio heads are different from base stations in that they transmit and receive RF signals, but do not have most or all of the higher layer functionality associated with a base station such as scheduling, medium access control, connectivity to neighboring base stations etc. For such functionality, the remote antennas and remote radio heads may rely on the associated base station.

According to another aspect of the disclosure, the UE provides the network information indicating that certain secondary cell measurements are not reliable. For example, the UE can mark some of the reported measurements as "not reliable". Alternatively, the UE can omit measurements that are not reliable. The UE can determine the reliability of the secondary cell measurements in various ways, some examples of which are described below. In one embodiment, the UE can consider the L3 filtered measurements to be unreliable if the variance of L1 measurements (on which the L3 filtering measurements are based) in a measurement period is higher than a specified threshold. For example, if the difference between the highest L1 measurement and the lowest L1 measurement sample exceeds a threshold. In another embodiment, the measurements to be reported to the eNB may be considered unreliable if either the L3 filter measurements or the L1 measurements on which the L3 filter measurements are based are older than a specified duration. This solution can also be applied to resolve measurements related issues in a multi-mode UE having multiple radio transceivers. For example, if the UE is equipped with a WiFi transceiver, the UE can experience a much lower measurements when WiFi transmission is occurring. In such a situation, the UE can mark measurements as unreliable or omit them if WiFi activity is ongoing when the measurements are performed.

Figure 6:
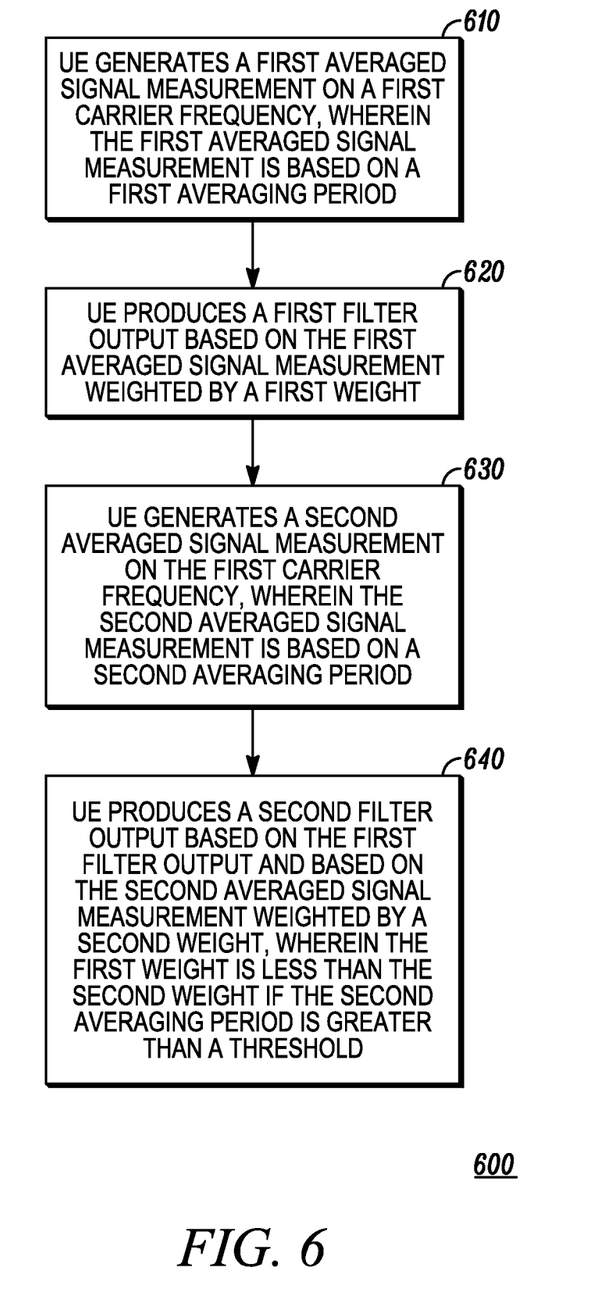
FIG. 6 illustrates another process flow diagram.

According to another aspect of the disclosure illustrated in the process diagram of FIG. 6, a wireless communication terminal generates a first averaged signal measurement on a first carrier frequency, wherein the first averaged signal measurement is based on a first averaging period at 610. At 620, the UE produces a first filter output based on the first averaged signal measurement weighted by a first weight. At 630, the UE generates a second averaged signal measurement on the first carrier frequency, wherein the second averaged signal measurement is based on a second averaging period. At 640, the UE produces a second filter output based on the first filter output and based on the second averaged signal measurement weighted by a second weight, wherein the first weight is less than the second weight if the second averaging period is greater than a threshold.

Generally, the UE produces a third filter output subsequent to producing the second filter output wherein the third filter output is based on the first weight or at least a weight different than the second weight. Thus the second weight is used only for one or more filter cycles with the effect of diminishing the impact of older filter outputs on the most recent filter output to provide the eNB with a more accurate indication of the radio conditions experienced by the UE.

In some implementations, the UE receives a message from an eNB ordering the UE to perform the signal measurements on the first carrier frequency using the second averaging period, as described further below. According to this implementation, the wireless communication infrastructure entity, or eNB, transmits a signal measurement averaging period for a first carrier frequency, wherein the signal measurement averaging period is transmitted to a wireless communication terminal configured for aggregated carrier operation. As suggested above, the eNB receives a filter output from the UE, wherein the filter output is generated based on a weighted signal measurement on the first carrier frequency, the signal measurement is averaged over the signal measurement averaging period, and the weight is dependent on the signal measurement averaging period. After making a handover decision based on the filter output received, the eNB may transmit a handover command to the UE as discussed further below.

In a more particular implementation, the UE produces the first filter output using a first filter coefficient and the UE produces the second filter output using a second filter coefficient if the second averaging period is greater than the threshold, wherein the second filter coefficient is different than the first filter coefficient. In one embodiment, the first filter output and second filter output are produced using an infinite impulse response filter, although other suitable filters may be used in other embodiments. In one embodiment, the first averaged signal measurement and the second averaged signal measurement are averaged layer 1 signal measurements, and the first and second filter outputs are layer 3 filtered measurements.

In one application, the second filter coefficient has a value that negates the first filter output component of the second filter output. More generally however the first filter output need not be negated entirely. Generally, the UE adjusts L3 filter coefficient to ensure that more recent measurements are weighted more heavily. One example of L3 filtering is based on the following IIR filter:

$$F_n = (1-a) \cdot F_{n-1} + a \cdot M_n,$$

Where $F_n$ is the new filtered measurement, $F_{n-1}$ is the previous filtered measurement and $M_n$ is the new L3 measurement, and $a=1/(2^{(k/4)})$, where k is the filter coefficient. Thus the UE can use the following techniques to ensure more recent measurements are weighted more heavily than less recent measurements. For example, when the UE is configured with a secondary cell measurement period that is larger than the primary measurement period, the UE can select a larger value of 'a' (i.e., choose a smaller value of k) for filtering of secondary cell measurements than that used for primary cell measurement filtering. When the UE notices that the latest (or latest n) secondary cell (Scell) measurement is much higher than the previous measurements, the UE uses an 'a' value of 1 to remove the effects of previous measurements from the filter for one or more L3 filter iterations. This effectively amounts to resetting the filter. Subsequently the UE can resume using a default or other optimized normal value of 'a'.

In some situations, it may be beneficial to use an 'a' value of greater than 1 to apply a higher weight to the most recent measurements. This can serve as a faster trigger for certain actions in the UE. For example, using an 'a' greater than 1 can cause the L3 filtered measurement to meet some measurement reporting criteria and hence cause the UE to transmit a measurement report to the base station sooner than it would with 'a=1'.

Figure 7:
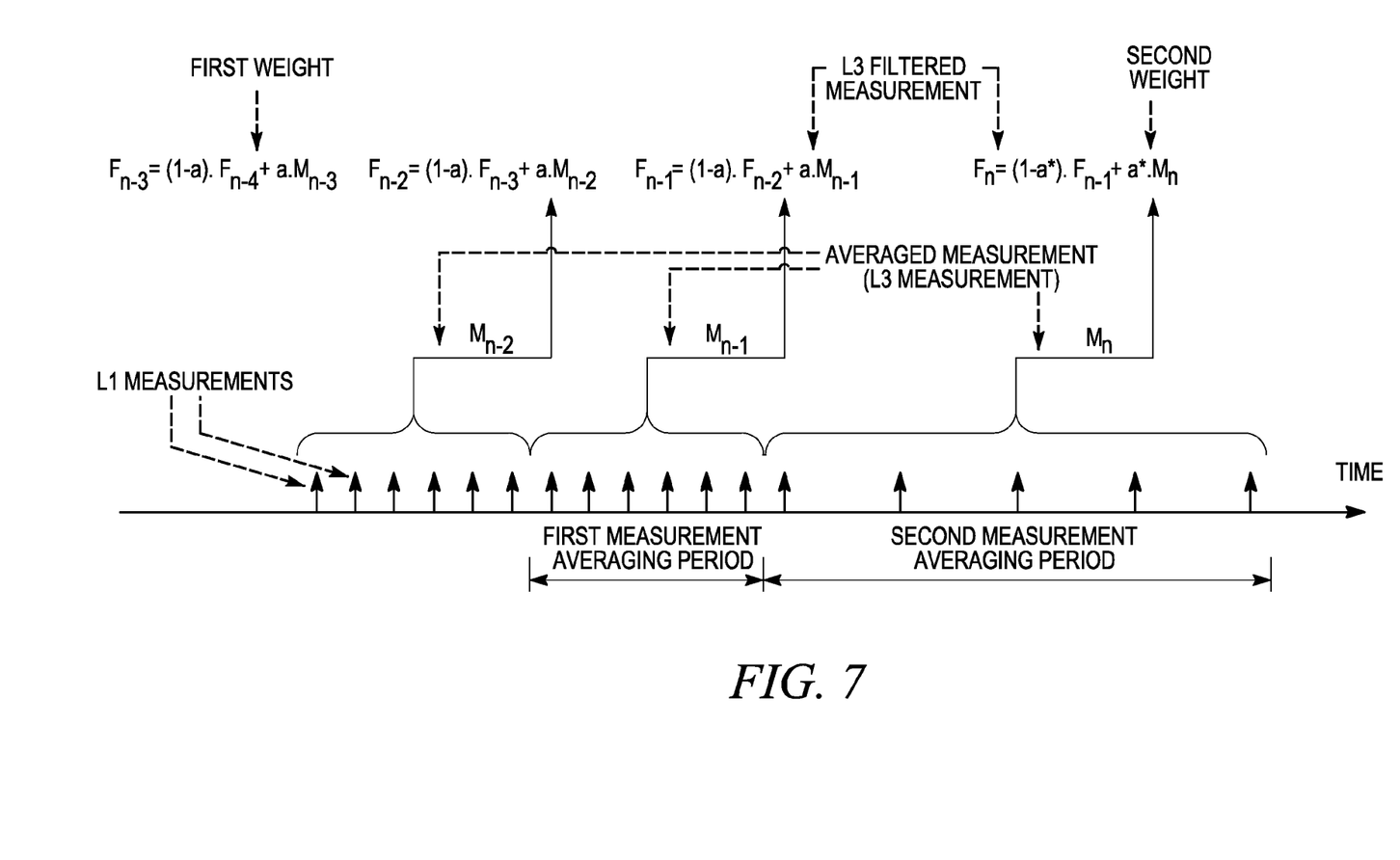
FIG. 7 illustrates averaging Layer 1 measurements and generating Layer 3 filtered measurements based on the Layer 1 measurements.

FIG. 7 illustrates Layer 1 (L1) signal measurements ($M_{n-1}$) averaged over a first measurement averaging period on a carrier frequency and the corresponding generation of a Layer 3 filter output ($F_{n-1}$) based on the averaged L1 signal measurement ($M_{n-1}$) and based on a prior filtered output ($F_{n-2}$) wherein a weighting factor is applied to the filter output ($F_{n-1}$) and the averaged signal measurements ($M_{n-1}$). Also illustrated are L1 signal measurements ($M_n$) averaged over a second measurement average period and the corresponding generation of a Layer 3 filter output ($F_n$) based on the averaged L1 signal measurement ($M_n$) and based on the prior filtered output ($F_{n-1}$) wherein a different weighting factor is applied to the prior filter output ($F_{n-1}$) and the averaged signal measurement ($M_n$) such that the prior filter output is negated or weighted less than the averaged signal measurement ($M_n$). After at least one iteration using the second measurement averaging period and the different weighting factor, L1 measurements revert to using the first measurement averaging period and a weighting factor that weights prior L3 filter outputs more heavily than does the second weighting factor.

In some embodiments, the UE reports the second filter output to a serving base station, which may use the report to make a handover decision. Thus in some instances, the UE receives a handover command from the serving base station in response to the report. The handover may be an intra-basestation handover or an inter-base-station handover. If the handover command is for an inter-base-station handover, the UE hands over to a second base station in a location different than the serving base station in response to receiving the command. In embodiments where the wireless communication terminal is configured for carrier aggregation and wherein the first carrier frequency is a deactivated carrier, the first serving cell may be configured as the primary serving cell in response to receiving the handover command.

As suggested above, this embodiment can be applied to resolve measurements related issues in a multi-mode UE having multiple radio transceivers, each of the transceivers supporting different radio technologies or similar radio technologies in different bands of the wireless spectrum. For example, if the UE is equipped with a WiFi transceiver, when the UE transmits WiFi signals, the UE can experience a sudden decrease in measurements. In such a situation, the UE can use a higher value of "a" (weight the more recent measurements more heavily) when WiFi activity is ongoing. The UE can also reset the filter by setting a=1 when WiFi activity is initiated. This can provide a more accurate view of the radio conditions when transmission of WiFi signals is started. After the WiFi activity ends, the UE can revert to using a lower value of 'a'.

According to another aspect of the disclosure, a wireless communication base station, or eNB, configures a wireless communication terminal to operate on a first serving cell on a first carrier frequency and on a second serving cell on a second carrier frequency. Such a configuration may be for carrier aggregation. The base station also configures the wireless communication terminal to use a first measurement period for the first serving cell and a second measurement period for the second serving cell. For example, the eNB in FIG. 1 configures a measurement period on the deactivated secondary cell CC2 that is considerably longer than the measurement period on the primary cell CC1. When the base station determines that a signal level at the wireless communication terminal of the first serving cell is below a threshold, the base station configures the wireless communication terminal to use a third measurement period for the second serving cell.

Such a determination may be made by the base station based on one or more measurement reports sent from the UE to the eNB. For example, the UE may be configured with periodical radio resource measurement (RRM) reporting. If a measurement report indicates that the primary cell drops below a threshold, the eNB can consider the primary cell signal to be deteriorating and reconfigures the measurement period for the deactivated cell as indicated above. The UE may be configured with event based RRM measurement reporting (e.g., A3 event) for the primary cell, such that the reporting occurs well before a handover is necessary. For this embodiment, a very conservative A3 offset is used. If a measurement report is triggered based on this event, the eNB can use the report as an indication that the primary cell signal is deteriorating and reconfigure the measurement period of the secondary as indicated above. The eNB may also observe a channel quality indication (CQI) of the primary cell dropping below a threshold and based on this assume that the primary cell signal is deteriorating. It can then reconfigure the measurement period as indicated above.

As mentioned above, the solutions above can be applied to resolve measurements related issues in a multi-mode UE having multiple radio transceivers, each of the transceivers supporting different radio technologies or similar radio technologies in different bands of the wireless spectrum. For example, the network can configure more frequent measurements in response to an indication from the UE that WiFi activity has been/will be initiated.

In other embodiments, the base station can select values of a filter coefficient to signal to the terminal. The base station can select values of the filter coefficient based on interference reported by the UE. For example, the UE reports measurements to the base station, the measurements indicating interference. If the interference is higher than a threshold, the base station can select a filter coefficient that results in a higher weight for the more recent measurements. Alternatively, the base station can select values of the filter coefficient based on another RAT. For example, the base station can receive an indication from the UE that a transceiver for another RAT is active at the UE. The base station can then select a filter coefficient suited to perform more accurate measurements taking one or more of the following criteria into account: activity on the other RAT, transmission frequency of the other RAT and characteristics of the other RAT.

Although the solutions are described in terms of radio resource management (RRM) measurements, the same principles can be applied to channel state information (CSI) measurements. This can be especially useful in obtaining reliable measurements in multi-mode UEs having multiple radio transceivers. For example, the UE can perform more frequent measurements and reporting of channel quality indication (CQI) when WiFi activity is initiated. The UE can also mark some CQI measurements as unreliable or omit them if WiFi activity is ongoing. Furthermore, the UE can use different filtering/averaging of CQI measurements when WiFi activity is initiated.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a wireless communication device, the method comprising:
    measuring a signal of a primary serving cell carrier signal;
    measuring a signal of a deactivated component carrier of a secondary serving cell at a first rate;
    determining a difference between the primary serving cell carrier signal and a neighboring cell carrier signal;
    if the determined difference between the primary serving cell carrier signal and the neighboring cell carrier signal is higher than a threshold value, measuring the signal of the deactivated secondary component carrier of the secondary serving cell at a second rate, the second rate being higher than the first rate;
    receiving a measurement reporting offset from a base station; and
    if the determined difference is higher than the measurement reporting offset, reporting the measured signal to the base station.

2. The method of claim 1 further comprising receiving, in response to the reporting step, a handover command from the base station.

3. The method of claim 2 wherein the handover command is a command for the wireless communication device to handover from the primary serving cell to the neighboring cell.

4. The method of claim 2:
    wherein the secondary cell becomes activated; and wherein the handover command is a command for the wireless communication device to handover from the primary serving cell to the activated secondary serving cell.

5. The method of claim 1 further comprising:
determining, based on the measured deactivated secondary component carrier signal, that the wireless communication device should handover from the primary serving cell; and
performing a handover from the primary serving cell based on the handover determination.

6. The method of claim 1, wherein the signal of the primary serving cell carrier signal is measured by:
generating a first averaged signal measurement on a first carrier frequency;
producing a first filter output based on the first averaged signal measurement weighted by a first weight;
generating a second averaged signal measurement on the first carrier frequency; and
producing a second filter output based on the first filter output and based on the second averaged signal measurement weighted by a second weight.

7. The method of claim 6, wherein the first averaged signal measurement is based on a first averaging period, the second averaged signal measurement is based on a second averaging period, and the first weight is less than the second weight if the second averaging period is greater than a threshold.

8. The method of claim 1, wherein the primary serving cell and the secondary serving cell are provided by a same base unit.

9. The method of claim 1 wherein the measured signal is reported to the base station at the second rate when the determined difference is higher than the measurement reporting offset.

* * * * *